United States Patent
Gholston et al.

(10) Patent No.: US 11,608,099 B1
(45) Date of Patent: Mar. 21, 2023

(54) HOOK ATTACHMENT FOR FOOTWEAR

(71) Applicants: Kendall Gholston, LaGrange, GA (US); Willie C. Knight, LaGrange, GA (US); Christine Gholston, LaGrange, GA (US); Dianne D. Knight, LaGrange, GA (US)

(72) Inventors: Kendall Gholston, LaGrange, GA (US); Willie C. Knight, LaGrange, GA (US); Christine Gholston, LaGrange, GA (US); Dianne D. Knight, LaGrange, GA (US)

( * ) Notice: Subject to any disclaimer, the term of this patent is extended or adjusted under 35 U.S.C. 154(b) by 51 days.

(21) Appl. No.: 17/082,257

(22) Filed: Oct. 28, 2020

(51) Int. Cl.
  *A43C 19/00* (2006.01)
  *B62B 5/00* (2006.01)
  *A43B 3/16* (2022.01)

(52) U.S. Cl.
  CPC .................. *B62B 5/00* (2013.01); *A43B 3/16* (2013.01); *A43C 19/00* (2013.01)

(58) Field of Classification Search
  CPC ......... A43C 19/00; A43C 17/00; A43C 17/02; A43C 17/04; Y10S 273/18
  USPC ............. 36/132, 136, 7.2, 7.4, 7.7, 72 r, 133
  See application file for complete search history.

(56) References Cited

U.S. PATENT DOCUMENTS

| | | | | |
|---|---|---|---|---|
| 664,627 A | * | 12/1900 | Eberlein | B26B 1/04 30/297 |
| 756,198 A | * | 4/1904 | Adams | A43B 7/32 36/72 R |
| 1,426,668 A | * | 8/1922 | Pardee et al. | A43C 15/063 30/297 |
| 2,269,357 A | * | 1/1942 | Theodore | A63B 59/60 473/412 |
| 3,268,209 A | * | 8/1966 | Humbyrd | E04G 21/26 254/120 |
| 3,421,234 A | | 1/1969 | Sargent | |
| 3,851,410 A | * | 12/1974 | Frazier | A43B 5/18 36/133 |
| 4,523,582 A | * | 6/1985 | Barber | A61H 1/0218 602/36 |
| 5,501,561 A | * | 3/1996 | Wulff | E04F 21/1894 254/131 |
| 7,152,286 B2 | | 12/2006 | Rooney et al. | |
| 7,328,528 B2 | | 2/2008 | Caminiti | |
| 9,918,517 B2 | | 3/2018 | Hansen | |
| 2001/0001168 A1 | | 5/2001 | Zazzi | |
| 2014/0259797 A1 | * | 9/2014 | Atkins | A43B 7/32 2/245 |

(Continued)

FOREIGN PATENT DOCUMENTS

FR 2661594 A1 * 11/1991

*Primary Examiner* — Ted Kavanaugh
(74) *Attorney, Agent, or Firm* — Cramer Patent & Design, PLLC; Aaron R. Cramer

(57) ABSTRACT

The hand truck foot hook may comprise a retaining strap and a hook. The hand truck foot hook may be adapted to pull the bottom of a hand truck out from under a load using a foot of a user. The retaining strap may detachably couple to a shoe worn on the foot of the user. The hook may be coupled to the retaining strap such that the hook is accessible on the top of the foot. The hook may removably engage the bottom of the hand truck such that the bottom of the hand truck is pulled back when the shoe is pulled back. As a non-limiting example, the hook may engage an axle of the hand truck.

17 Claims, 10 Drawing Sheets

(56) References Cited

U.S. PATENT DOCUMENTS

2015/0196094 A1* 7/2015 Hansen .................... A43B 3/16
 414/800
2018/0000200 A1* 1/2018 Bloom ..................... A43C 1/00

* cited by examiner

HOOK ATTACHMENT FOR FOOTWEAR

RELATED APPLICATIONS

Non-applicable.

FIELD OF THE INVENTION

The invention relates generally to a hook attachment and more specifically to a hook attachment for an article of footwear.

BACKGROUND OF THE INVENTION

The common hand truck is a very useful piece of equipment that receives almost constant use daily around the world. It is used to transport smaller items ranging from small boxes to refrigerator sized devices with ease. A single person, balancing the load over an axle supported by two wheels can quickly and easily move large and/or heavy items. While a hand truck is very versatile at moving such loads by one person, removing the hand truck once the user is at the delivery location is somewhat more frustrating. Usually the user attempts to hook their toe under the axle of the hand truck and pull it out.

Most times however, the weight of the parcels makes this process difficult and results in the user's toe slipping free while the hand truck stays firmly in place. This results in the user having to unstack any boxes one by one resulting in extra time. Others may attempt to kick the hand truck free resulting in possible damage to the parcels, the hand truck or even the user's foot. Accordingly, there exists a need for a means by which a hand truck can be safely and quickly removed from under a load of parcels in a manner that address the above described problem. The development of the hook attachment for footwear fulfills this need.

SUMMARY OF THE INVENTION

The principles of the present invention provide for a hand truck foot hook that has a retaining strap which includes a bridge panel, an under-strap, and a backstrap. The bridge panel is placed on a bridge of a shoe such that the bridge panel is located at the top of the shoe. The bridge panel couples to the under-strap at an under-strap junction. The bridge panel also couples to the backstrap at a backstrap junction. The retaining strap is adapted to detachably couple to the shoe worn on a foot of a user. The hand truck foot hook also has a hook which has a shank, a bend, and a tip, the hook is coupled to the bridge panel and the hook is coupled to the retaining strap such that the hook is accessible on the top of the foot. The hook removably engages the bottom of the hand truck such that the bottom of the hand truck is pulled back when the shoe is pulled back. The hand truck foot hook also has an under-strap free end which is coupled to the bridge panel at an under-strap coupling point. The under-strap free end couples to the under-strap coupling point via an under-strap fastener. The hand truck foot hook also has a backstrap free end which is coupled to the bridge panel at a backstrap coupling point. The backstrap free end couples to the backstrap coupling point via a backstrap fastener.

The under-strap junction may orient the under-strap towards the bottom of the shoe. The backstrap junction may orient the backstrap towards the rear of the shoe. The under-strap may wrap around the shoe by passing under the sole of the shoe. The backstrap may press against an Achilles tendon. The retaining strap may couple to the shoe by placing the bridge panel on top of the shoe, passing the under-strap under the shoe and coupling the under-strap fastener, and passing the backstrap behind the shoe and coupling the backstrap fastener.

The retaining strap may be made from a durable and flexible material selected from the group consisting of natural leather, synthetic leather, nylon, polypropylene, Kevlar, synthetic webbing, or any combinations of the same. The bridge panel, the under-strap, and the backstrap may be made from a single piece of material. The bridge panel, the under-strap, and the backstrap may be made separately and are joined together. The hook may be oriented above the shoe such that the tip points away from a toe of the shoe. The shank couples to the bridge panel via a hook attachment point. The hook includes a flat upper surface. The hook is a J-shaped armature.

The hook may be made from a rigid material selected from the group consisting of metal, plastic, composite resin, or combinations of the same. The under-strap fastener may be distributed between the under-strap and the bridge panel to make the under-strap fastener operable. The under-strap fastener may be selected from the group consisting of a buckle, a clasp, a strap slip lock, a tri-glide buckle, a quick-release buckle, a hook-and-loop-type fastener, a snap, or any combination thereof. The under-strap may be positioned in front of a heel of the shoe to prevent the under-strap from wearing as the shoe touches the floor. The backstrap fastener may be distributed between the backstrap and the bridge panel to make the backstrap fastener operable. The backstrap fastener may be selected from the group consisting of a buckle, a clasp, a strap slip lock, a tri-glide buckle, a quick-release buckle, a hook-and-loop-type fastener, a snap, or combinations of the same. The hand truck foot hook may be adapted to pull the bottom of the hand truck out from under a load using the foot of the user.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
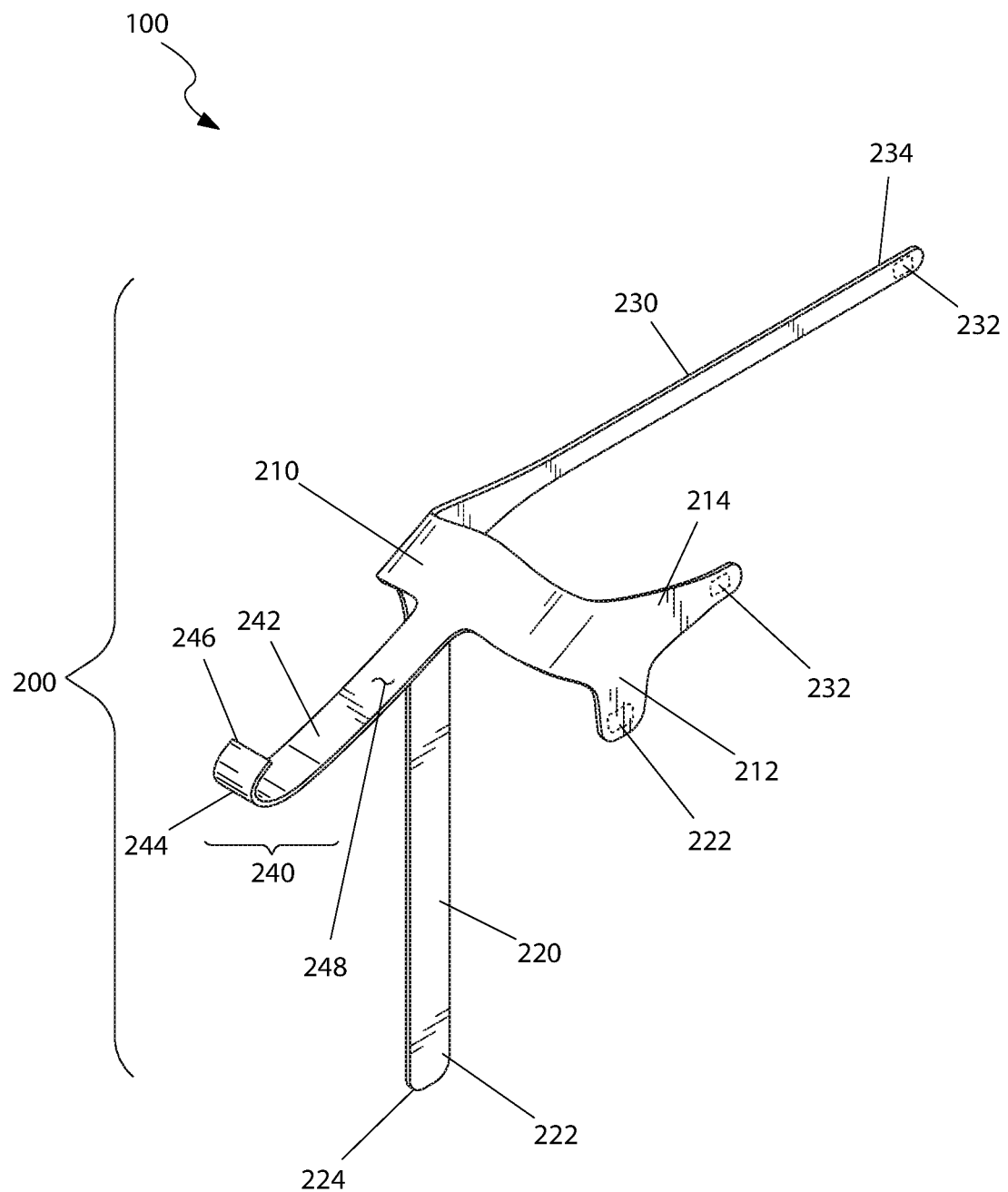
FIG. 1 is an isometric front view of a hand truck foot hook, according to an embodiment of the present invention.
Figure 2:
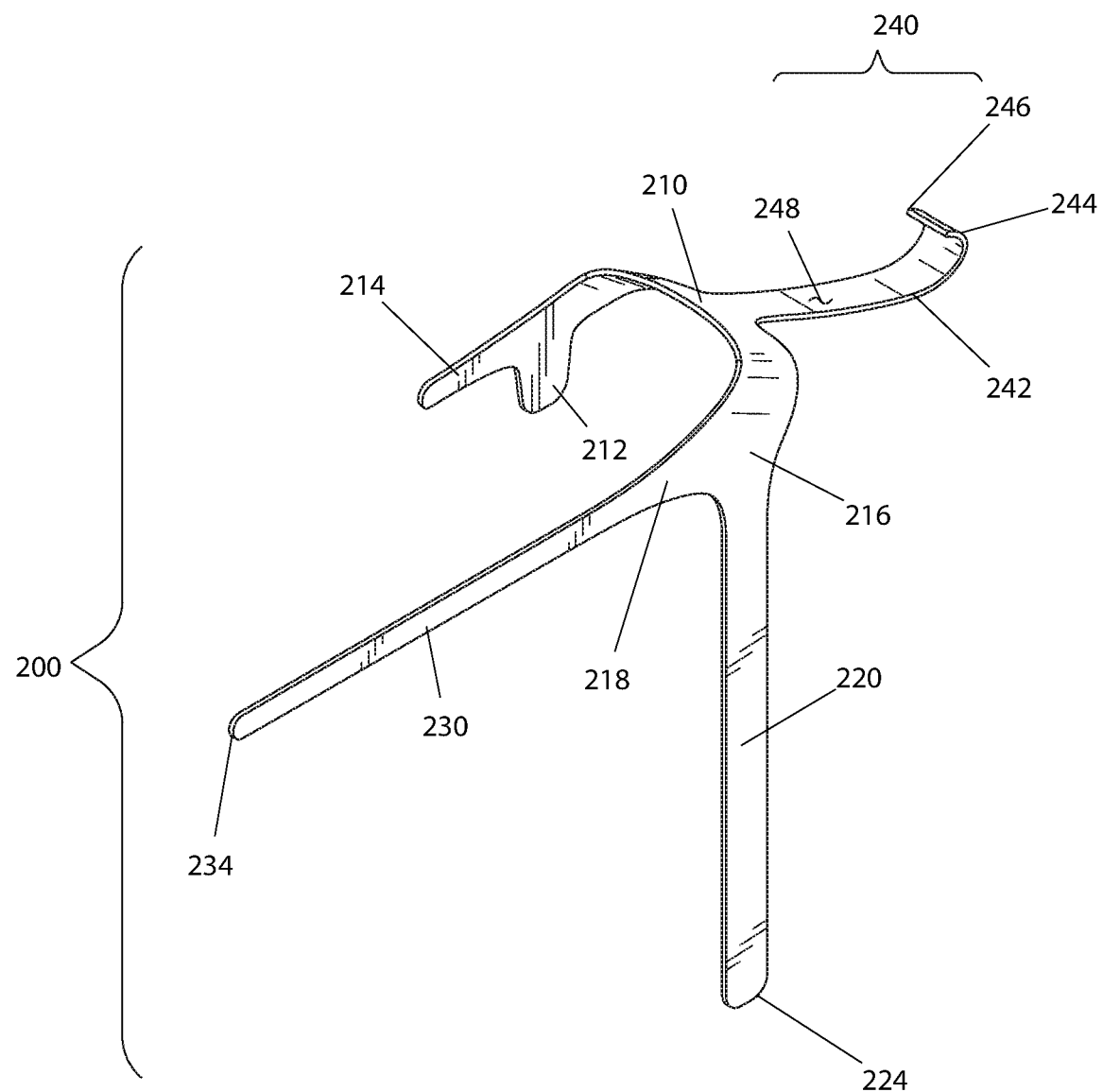
FIG. 2 is an isometric rear view of a hand truck foot hook, according to an embodiment of the present invention.
Figure 3:
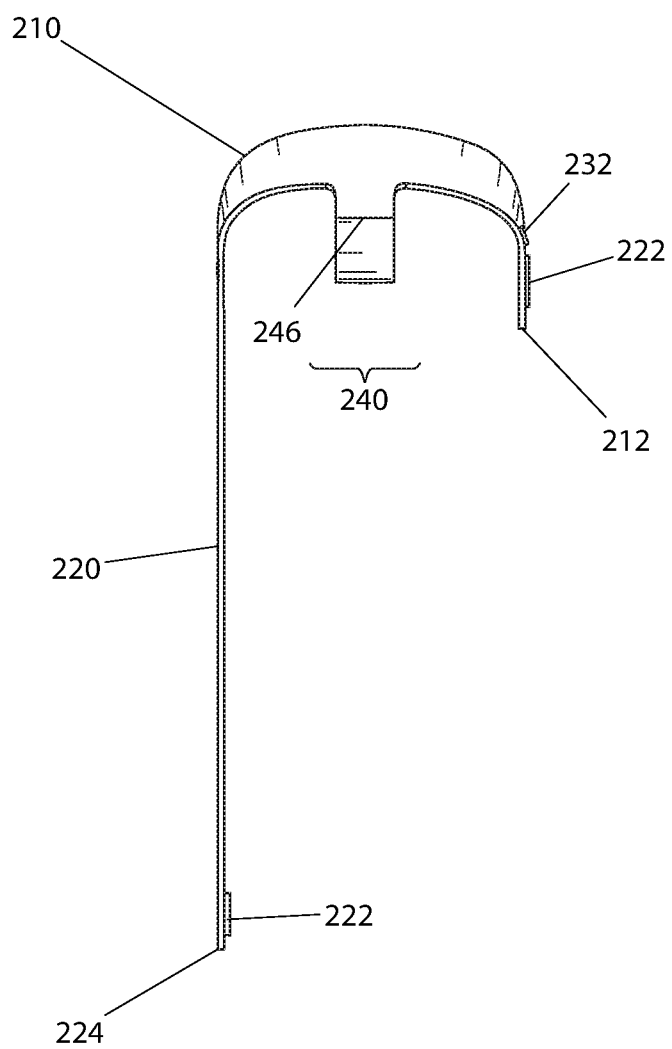
FIG. 3 is a front view of a hand truck foot hook, according to an embodiment of the present invention.
Figure 4:
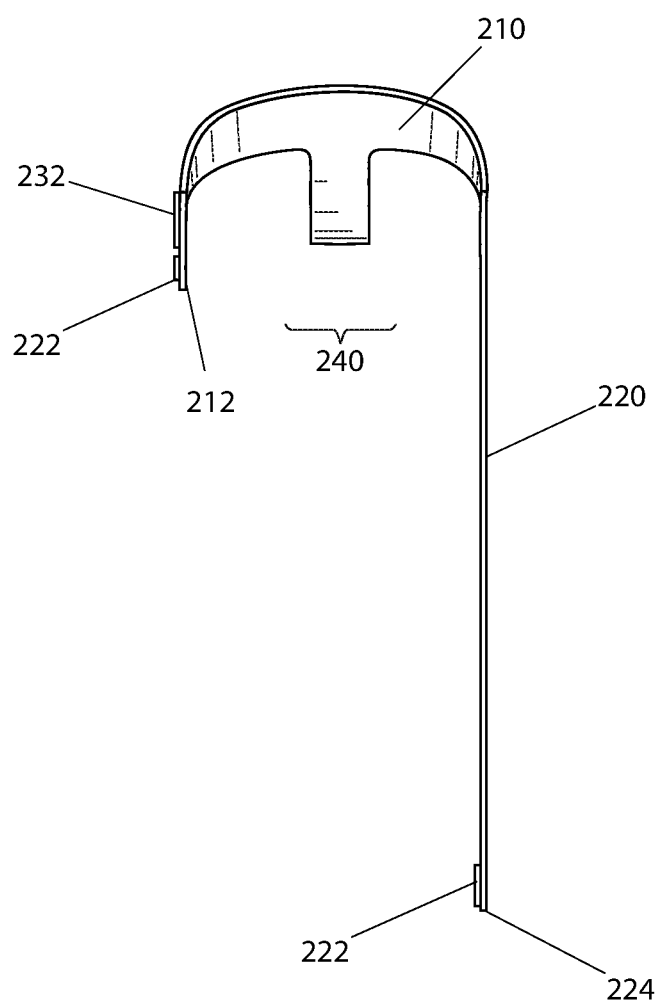
FIG. 4 is a rear view of a hand truck foot hook, according to an embodiment of the present invention.
Figure 5:
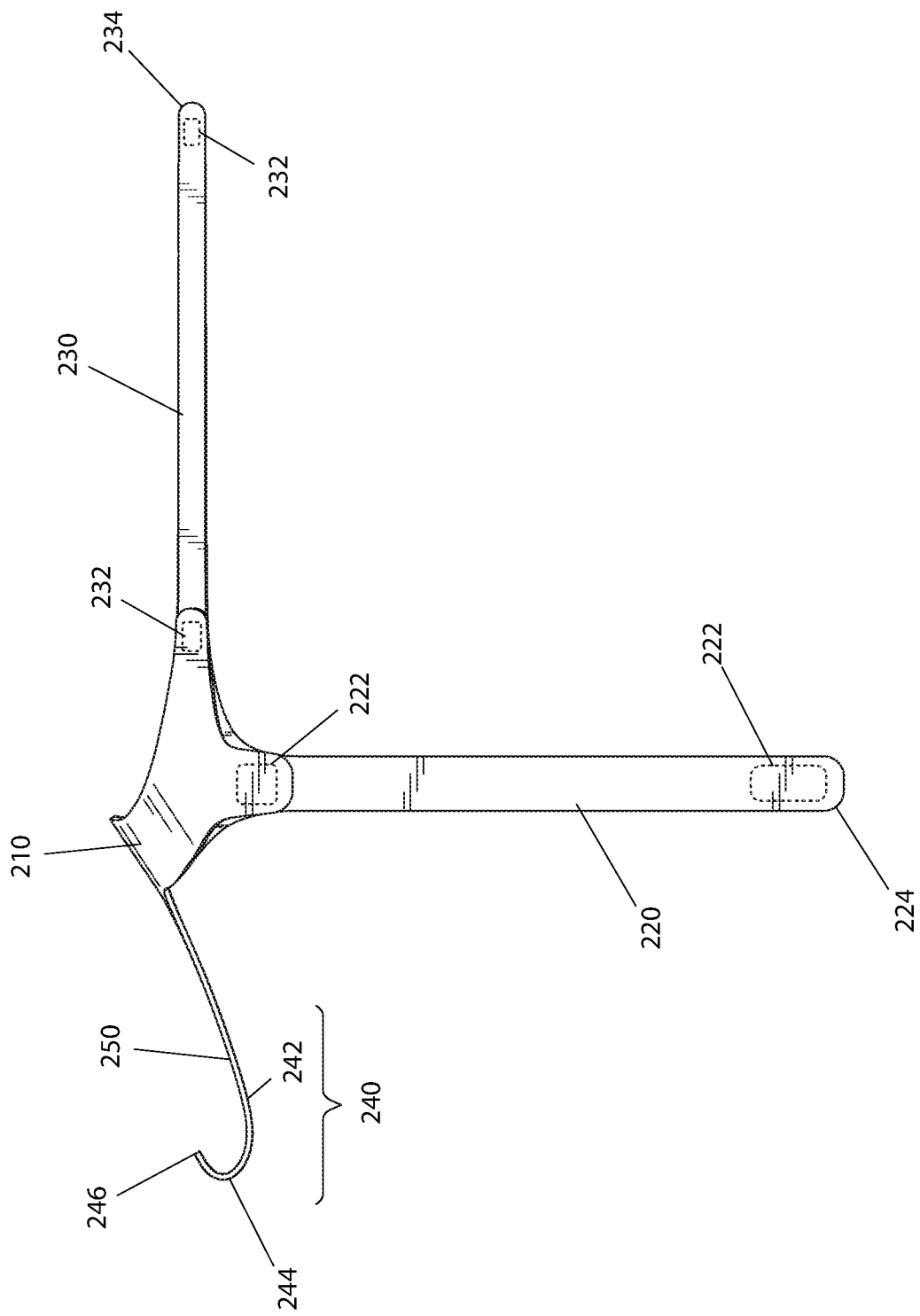
FIG. 5 is a left side view of a hand truck foot hook here, according to an embodiment of the present invention.
Figure 6:
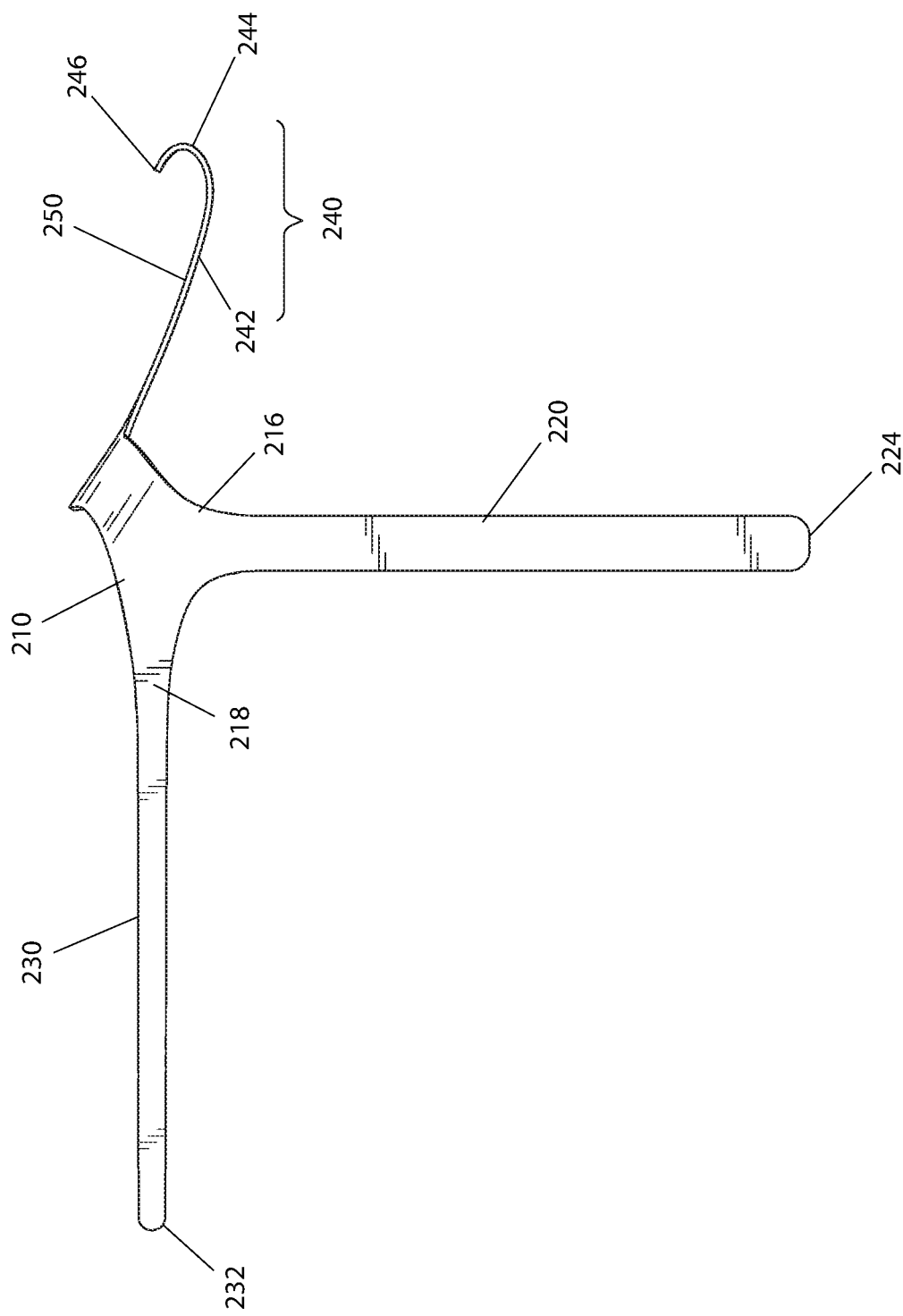
FIG. 6 is a right side of a hand truck foot hook, according to an embodiment of the present invention.
Figure 7:
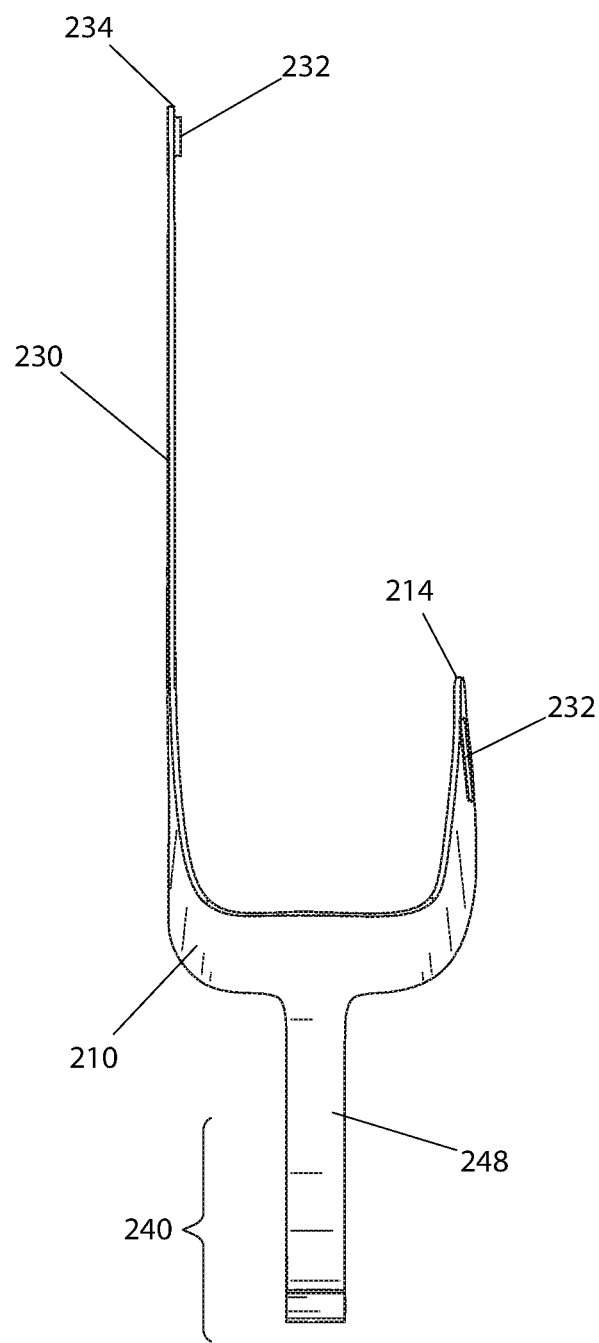
FIG. 7 is a top view of a hand truck foot hook, according to an embodiment of the present invention.
Figure 8:
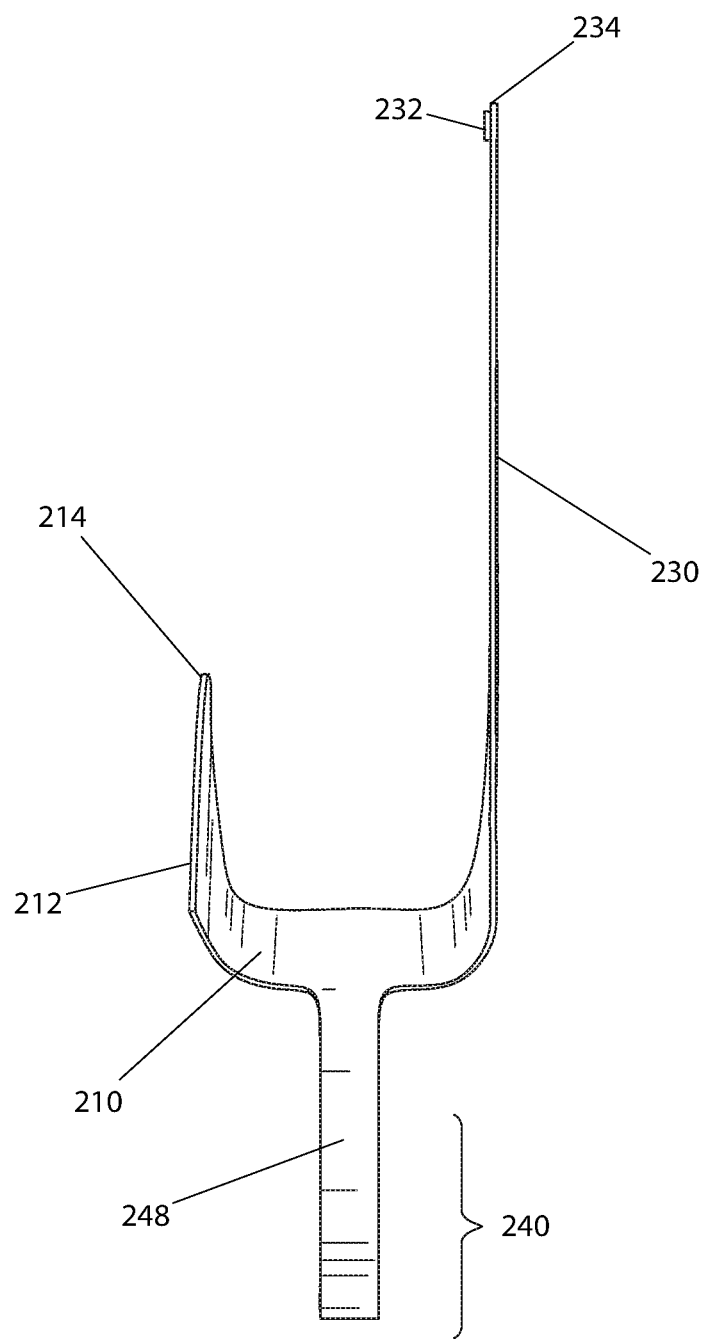
FIG. 8 is a bottom view of a hand truck foot hook, according to an embodiment of the present invention.
Figure 9:
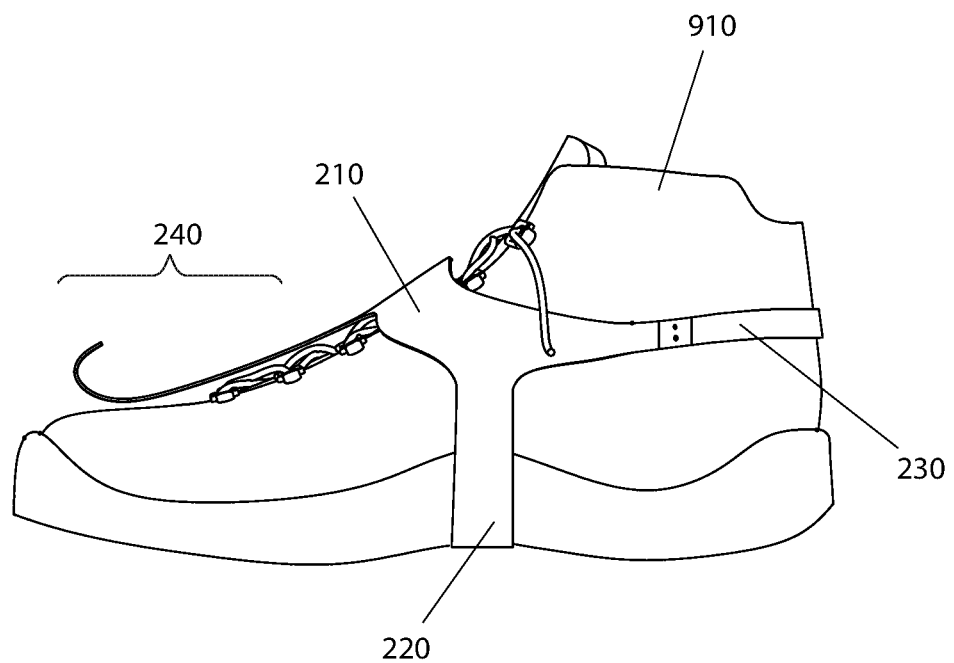
FIG. 9 is a detail view of a hand truck foot hook, according to an embodiment of the present invention, illustrating the hand truck foot hook installed on a shoe.
Figure 10:
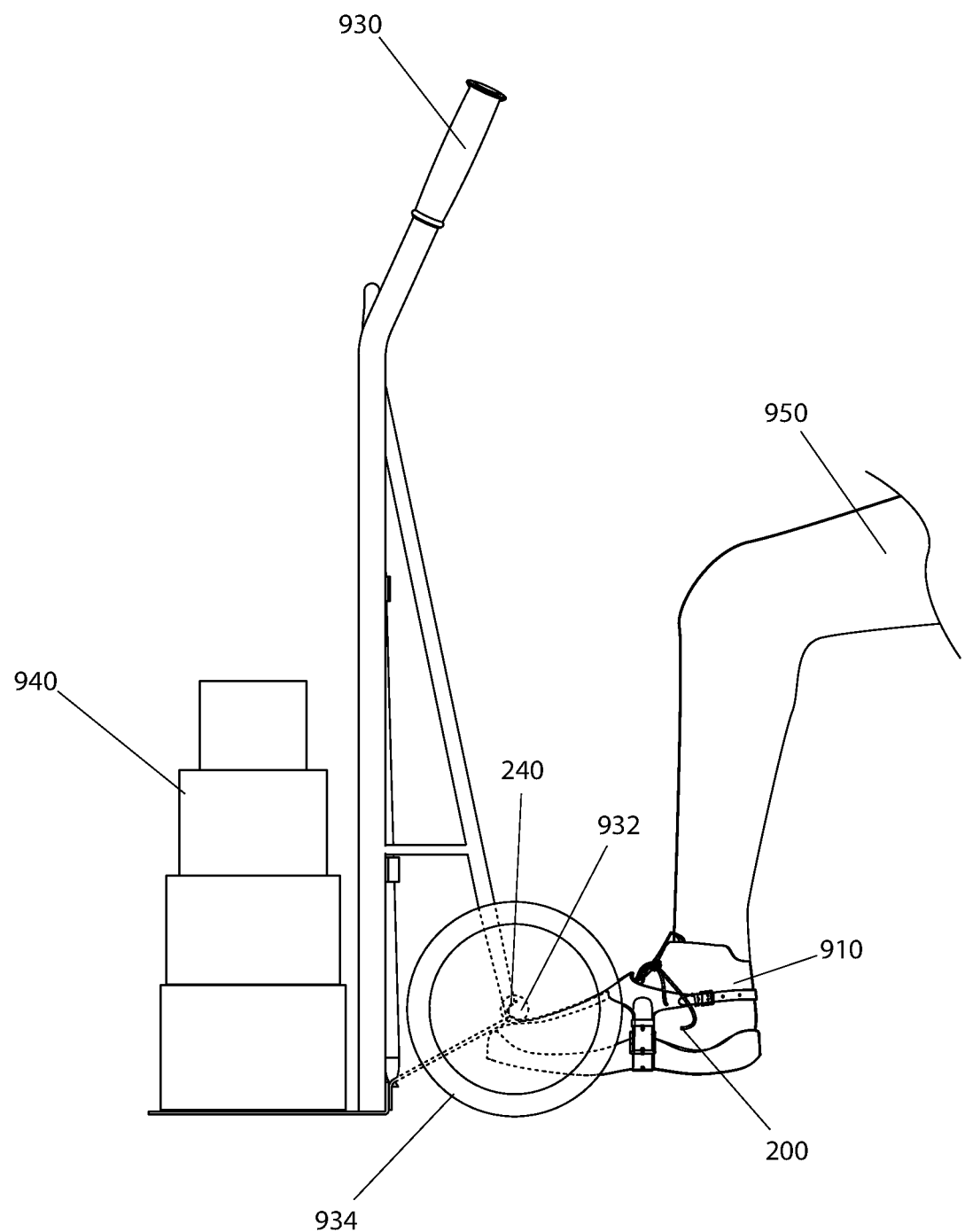
FIG. 10 is a detail view of a hand truck foot hook, according to an embodiment of the present invention, illustrating the hand truck foot hook extracting the hand truck from under a load.

DESCRIPTIVE KEY 100 hand truck foot hook
200 retaining strap
210 bridge panel
212 under-strap coupling point
214 backstrap coupling point
216 under-strap junction
218 backstrap junction
220 under-strap
222 under-strap fastener
224 under-strap free end
230 backstrap
232 backstrap fastener
234 backstrap free end
240 hook
242 shank
244 bend
246 tip
248 hook attachment point
250 flat upper surface
910 shoe
930 hand truck
932 axle
934 wheel
940 load
950 user Description of the Invention The present invention is directed to a hand truck foot hook (herein described as the "invention") 100. The invention 100 may comprise a retaining strap 200 and a hook 240. The invention 100 may be adapted to pull the bottom of a hand truck 930 out from under a load 940 using a foot of a user 950. The retaining strap 200 may be adapted to detachably couple to a shoe 910 worn on the foot of the user 950. The hook 240 may be coupled to the retaining strap 200 such that the hook 240 is accessible on the top of the foot. The hook 240 may removably engage the bottom of the hand truck 930 such that the bottom of the hand truck 930 is pulled back when the shoe 910 is pulled back. As a non-limiting example, the hook 240 may engage an axle 932 of the hand truck 930. The axle 932 may be easily accessible for coupling the hook 240 because the axle 932 is elevated above a floor by wheels 934 of the hand truck 930 and the shoe 910 may slide under the axle 932 through the gap between the axle 932 and the floor. If the hand truck 930 is tilted forward to lift the back of the load 940 and rest the front of the load 940 on the floor when the shoe 910 is pulled back, the hand truck 930 may be pulled out from under the load 940.

The retaining strap 200 may be adapted to removably couple to the shoe 910. The retaining strap 200 may comprise a bridge panel 210, an under-strap 220, and a backstrap 230. The bridge panel 210 may be placed on a bridge of the shoe 910 such that the bridge panel 210 is located at the top of the shoe 910. The bridge panel 210 may couple to the under-strap 220 at an under-strap junction 216. The under-strap junction 216 may orient the under-strap 220 towards the bottom of the shoe 910. The bridge panel 210 may couple to the backstrap 230 at a backstrap junction 218. The backstrap junction 218 may orient the backstrap 230 towards the rear of the shoe 910.

The under-strap 220 may wrap around the shoe 910 by passing under a sole of the shoe 910. An under-strap free end 224 may couple to the bridge panel 210 at an under-strap coupling point 212. The under-strap free end 224 may couple to the under-strap coupling point 212 via an under-strap fastener 222. As non-limiting examples, the under-strap fastener 222 may comprise a buckle, a clasp, a strap slip lock, a tri-glide buckle, a quick-release buckle, a hook-and-loop-type fastener, a snap, or combinations thereof. The under-strap fastener 222 may be distributed between the under-strap 220 and the bridge panel 210 as required to make the under-strap fastener 222 operable. As a non-limiting example, the hook portion of the hook-and-loop-type fastener may be coupled to the under-strap free end 224 and the loop portion of the hook-and-loop-type fastener may be coupled to the under-strap coupling point 212 of the bridge panel 210.

The backstrap 230 may wrap around the shoe 910 by passing around the rear of the shoe 910. As a non-limiting example, the backstrap 230 may press against an Achilles tendon. A backstrap free end 234 may couple to the bridge panel 210 at a backstrap coupling point 214. The backstrap free end 234 may couple to the backstrap coupling point 214 via a backstrap fastener 232. As non-limiting examples, the backstrap fastener 232 may comprise a buckle, a clasp, a strap slip lock, a tri-glide buckle, a quick-release buckle, a hook-and-loop-type fastener, a snap, or combinations thereof. The backstrap fastener 232 may be distributed between the backstrap 230 and the bridge panel 210 as required to make the backstrap fastener 232 operable. As a non-limiting example, the hook portion of the hook-and-loop-type fastener may be coupled to the backstrap free end 234 and the loop portion of the hook-and-loop-type fastener may be coupled to the backstrap coupling point 214 of the bridge panel 210.

The retaining strap 200 may couple to the shoe 910 by placing the bridge panel 210 on the top of the shoe 910, passing the under-strap 220 under the shoe 910 and coupling the under-strap fastener 222, and passing the backstrap 230 behind the shoe 910 and coupling the backstrap fastener 232. The under-strap 220 may be positioned in front of a heel of the shoe 910 to prevent the under-strap 220 from wearing as the shoe 910 touches the floor.

The hook 240 may be a J-shaped armature that is coupled to the bridge panel 210. The hook 240 may comprise a shank 242, a bend 244, and a tip 246. The hook 240 may be oriented above the shoe 910 such that the tip 246 points away from a toe of the shoe 910. The shank 242 may couple to the bridge panel 210 via a hook attachment point 248. In some embodiments, the hook 240 may comprise a flat upper surface 250.

The retaining strap 200 may be made from one (1) or more durable, flexible material. As non-limiting examples, the retaining strap 200 may be made from natural or synthetic leather, nylon, polypropylene, Kevlar, synthetic webbing, or combinations thereof. The hook 240 may be made from a rigid material. As non-limiting examples, the hook 240 may be made from metal, plastic, composite resin, or combinations thereof.

The bridge panel 210, the under-strap 220, and the backstrap 230 may be fabricated as a single piece of material or may be fabricated separately and then joined together. The retaining strap 200 may be available in multiple sizes or as "one-size fits all". As non-limiting examples, the retaining strap 200 may suggest a correct fit for a specific range of shoe sizes or the under-strap fastener 222 and the backstrap fastener 232 may allow adjustment to cover a wide range of shoe sizes. The retaining strap 200 may couple to either a right shoe or a left shoe. In some cases, the user 950 may choose to wear the invention 100 on both shoes.

In use, the user 950 may couple the invention 100 to the shoe 910 by placing the bridge panel 210 on the top of the shoe 910, passing the under-strap 220 under the shoe 910 and coupling the under-strap fastener 222, and passing the backstrap 230 behind the shoe 910 and coupling the backstrap fastener 232. The user 950 may push the hand truck 930 laden with the load 940 to a destination where it is desired to remove the load 940 from the hand truck 930. Upon reaching the destination, the user 950 may tilt the hand truck 930 forward and place the shoe 910 that bears the invention 100 under the hand truck 930 to engage the hook 240 with the hand truck 930. As a non-limiting example, the hook 240 may catch the axle 932 of the hand truck 930. The user 950 may pull the shoe 910 back to drag the hand truck 930 out from under the load 940. Gravity, higher friction between the front of the load 940 and the floor, lower friction between the bottom of the load 940 and the hand truck 930, or combinations thereof may aid in removing the load 940 from the hand truck 930 as the shoe 910 pulls the hand truck 930 rearwards. When the hand truck 930 is clear of the load 940, the user 950 may decouple the invention 100 from the hand truck 930 by moving the shoe 910 forward and downward to disengage the hook 240 from the hand truck 930.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A hand truck foot hook, consisting of:
a retaining strap including a bridge panel, an under-strap, and a backstrap, the bridge panel is adapted to be placed on a bridge of a shoe such that the bridge panel is adapted to be located at the top of the shoe, the bridge panel couples to the under-strap at an under-strap junction, the bridge panel couples to the backstrap at a backstrap junction, the retaining strap is adapted to detachably couple to the shoe worn on a foot of a user;
a hook having a shank, a bend, and a tip, the hook is coupled to the bridge panel and the hook is coupled to the retaining strap such that the hook is adapted to be accessible on the top of the foot above a plurality of user's toes, the hook removably is adapted to be engaging the bottom of the hand truck such that the bottom of the hand truck is adapted to be pulled back when the shoe is pulled back;
an under-strap free end coupled to the bridge panel at an under-strap coupling point, the under-strap free end couples to the under-strap coupling point via an under-strap fastener;
a backstrap free end coupled to the bridge panel at a backstrap coupling point, the backstrap free end couples to the backstrap coupling point via a backstrap fastener;
wherein the backstrap is adapted to be pressed against an Achilles tendon;
wherein the hook is adapted to be oriented above the shoe such that the tip points away from a toe of the shoe; and
wherein the hand truck foot hook is adapted to pull the bottom of the hand truck out from under a load using the foot of the user.

2. The hand truck foot hook, according to claim 1, wherein the under-strap junction is adapted to be orienting the under-strap towards the bottom of the shoe.

3. The hand truck foot hook, according to claim 1, wherein the backstrap junction is adapted to be orienting the backstrap towards the rear of the shoe.

4. The hand truck foot hook, according to claim 1, wherein the under-strap is adapted to be wrapped around the shoe by passing under the sole of the shoe.

5. The hand truck foot hook, according to claim 1, wherein the retaining strap is adapted to be coupled to the shoe by placing the bridge panel on top of the shoe, and is adapted to be passing the under-strap under the shoe and coupling the under-strap fastener, and is adapted to be passing the backstrap behind the shoe and coupling the backstrap fastener.

6. The hand truck foot hook, according to claim 1, wherein the retaining strap is made from a durable and flexible material selected from the group consisting of natural leather, synthetic leather, nylon, polypropylene, Kevlar, synthetic webbing, or any combinations thereof.

7. The hand truck foot hook, according to claim 1, wherein the bridge panel, the under-strap, and the backstrap are made from a single piece of material.

8. The hand truck foot hook, according to claim 1, wherein the bridge panel, the under-strap, and the backstrap are made separately and are joined together.

9. The hand truck foot hook, according to claim 1, wherein the shank couples to the bridge panel via a hook attachment point.

10. The hand truck foot hook, according to claim 1, wherein the hook includes a flat upper surface.

11. The hand truck foot hook, according to claim 1, wherein the hook is a J-shaped armature.

12. The hand truck foot hook, according to claim 1, wherein the hook is made from a rigid material selected from the group consisting of metal, plastic, composite resin, or combinations thereof.

13. The hand truck foot hook, according to claim 1, wherein the under-strap fastener is distributed between the under-strap and the bridge panel to make the under-strap fastener operable.

14. The hand truck foot hook, according to claim 1, wherein the under-strap fastener is selected from the group consisting of a buckle, a clasp, a strap slip lock, a tri-glide buckle, a quick release buckle, a hook-and-loop-type fastener, a snap, or any combination thereof.

15. The hand truck foot hook, according to claim 1, wherein the under-strap is adapted to be positioned in front of a heel of the shoe to prevent the under-strap from wearing as the shoe touches the floor.

16. The hand truck foot hook, according to claim 1, wherein the backstrap fastener is distributed between the backstrap and the bridge panel to make the backstrap fastener operable.

17. The hand truck foot hook, according to claim 1, wherein the backstrap fastener is selected from the group consisting of a buckle, a clasp, a strap slip lock, a tri-glide buckle, a quick release buckle, a hook-and-loop-type fastener, a snap, or combinations thereof.

* * * * *